(12) United States Patent
Choi et al.

(10) Patent No.: US 9,698,862 B2
(45) Date of Patent: Jul. 4, 2017

(54) TRANSFORMED KERNELS FOR CANCELLING NON-LINEAR DISTORTION

(71) Applicant: Intel Corporation, Santa Clara, CA (US)

(72) Inventors: Yang-Seok Choi, Portland, OR (US);
Feng Xue, Redwood City, CA (US);
Shu-Ping Yeh, New Taipei (TW);
Shilpa Talwar, Los Altos, CA (US)

(73) Assignee: INTEL CORPORATION, Santa Clara, CA (US)

( * ) Notice: Subject to any disclaimer, the term of this patent is extended or adjusted under 35 U.S.C. 154(b) by 19 days.

(21) Appl. No.: 14/751,246

(22) Filed: Jun. 26, 2015

(65) Prior Publication Data

US 2016/0173165 A1     Jun. 16, 2016

Related U.S. Application Data

(60) Provisional application No. 62/090,806, filed on Dec. 11, 2014.

(51) Int. Cl.
*H04B 1/44*    (2006.01)
*H04B 1/525*    (2015.01)
*H04B 1/48*    (2006.01)

(52) U.S. Cl.
CPC ....... *H04B 1/525* (2013.01); *H04B 2001/485* (2013.01)

(58) Field of Classification Search
CPC ..... H04B 1/48; H04B 2001/485; H04B 1/525
USPC ........................................................ 455/78
See application file for complete search history.

(56) References Cited

U.S. PATENT DOCUMENTS

| 6,678,318 B1* | 1/2004 | Lai ................. H04L 25/0216 375/232 |
| 2008/0159551 A1* | 7/2008 | Harley ............... H04M 9/082 381/66 |
| 2012/0140860 A1 | 6/2012 | Rimini et al. |

OTHER PUBLICATIONS

Kuech et al., "Nonlinear Acoustic Echo Cancellation Using Adaptive Orthogonalized Power Filters", IEEE International Conference on Acoustics, Speech, and Signal Processing, Mar. 2005, 4 pages, IEEE.

(Continued)

*Primary Examiner* — Eugene Yun
(74) *Attorney, Agent, or Firm* — Viering, Jentschura & Partner mbB

(57) ABSTRACT

Disclosed are a method, computing device, and a non-transitory computer-readable medium storing computer-executable instructions which, when executed, cause a processor to perform operations, which may include: sending a transmit signal including non-linear elements; receiving another signal comprising at least a portion of the transmit signal through a receive chain of a computing device; simulating the transmit chain; generating, by the simulated transmit chain, a first signal associated with the transmit signal; generating a second signal by frequency shifting the first signal; generating one or more first kernels associated with the second signal; performing decimation of the one or more first kernels; transforming the one or more first kernels using a lower triangular matrix, into one or more second kernels; combining the one or more second kernels to generate an echo cancellation signal; and subtracting the echo cancellation signal from the received at least a portion of the transmit signal.

20 Claims, 7 Drawing Sheets

(56) References Cited

OTHER PUBLICATIONS

Abbas, "A Novel Fast Orthogonal Search Method for Design of Functional Link Networks and their Use in System Identification", IEEE International Conference on Systems, Man and Cybernetics, Oct. 2007, pp. 2743-2747, IEEE.

Bousquet et al., "Kernel Methods and their Applications to Signal Processing", IEEE International Conference on Acoustics, Speech and Signal Processing, Apr. 2003, pp. 860-863, vol. IV, IEEE.

* cited by examiner

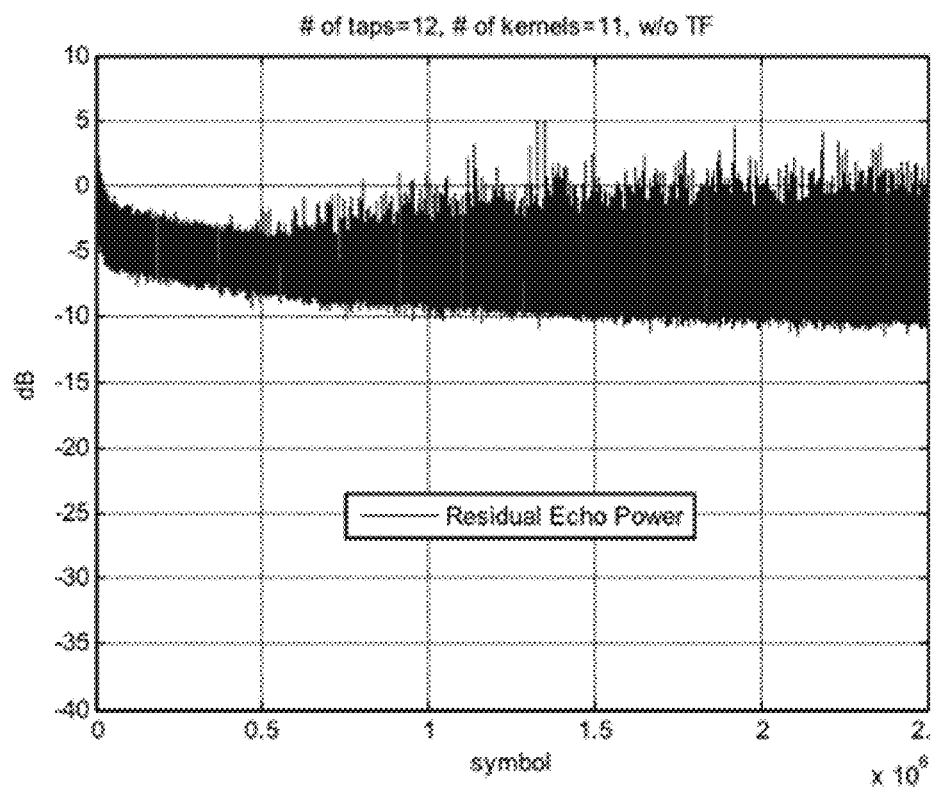
FIG. 4A  (a) without TF
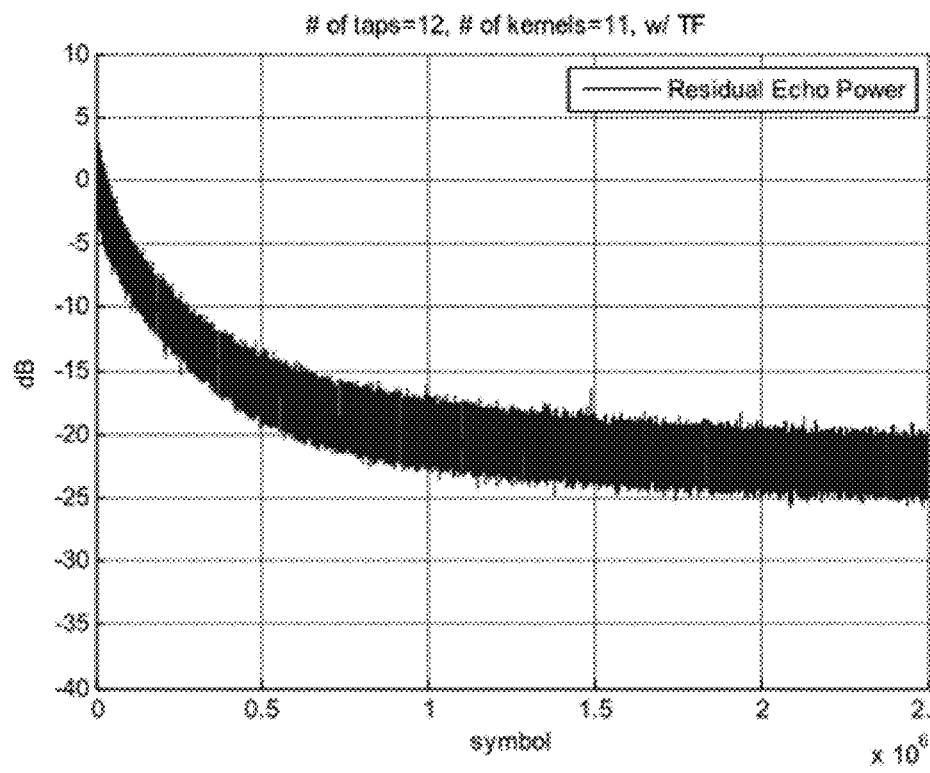
FIG. 4B  (b) with TF

# TRANSFORMED KERNELS FOR CANCELLING NON-LINEAR DISTORTION

CROSS-REFERENCE TO RELATED APPLICATION

This is a non-provisional application based upon U.S. provisional patent application Ser. No. 62/090,806, entitled "TRANSFORMED KERNELS FOR CANCELLING NON-LINEAR DISTORTION", filed Dec. 11, 2014, which is incorporated herein by reference.

TECHNICAL FIELD

Various embodiments relate generally to systems and methods for wireless communications and, more particularly, to echo cancellation using transformed kernels for cancelling non-linear distortion.

BACKGROUND

Wireless devices are becoming widely prevalent and are increasingly capable of supporting multiple wireless protocols, such as, LTE, Wi-Fi (wireless local area network), Bluetooth, or the like. These wireless devices are capable of operating in various modes at one time. For example, while streaming music in a Bluetooth mode, a tablet may receive Wi-Fi or LTE signals. Due to the increase in the capabilities of wireless devices, the various signals, transmitted and/or received, at a wireless device may result in signal leakage (e.g., echo) between its transmit and receive components. Such leakage may interfere with other signals intended for that computing device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various examples of the invention are described with reference to the following drawings, in which:

FIG. 4A depicts residual interferences without the transformation for an echo cancellation system, in accordance with one or more examples of the present disclosure;

FIG. 4B depicts residual interferences with the transformation for an echo cancellation system, in accordance with one or more examples of the present disclosure;

DESCRIPTION

Figure 1:
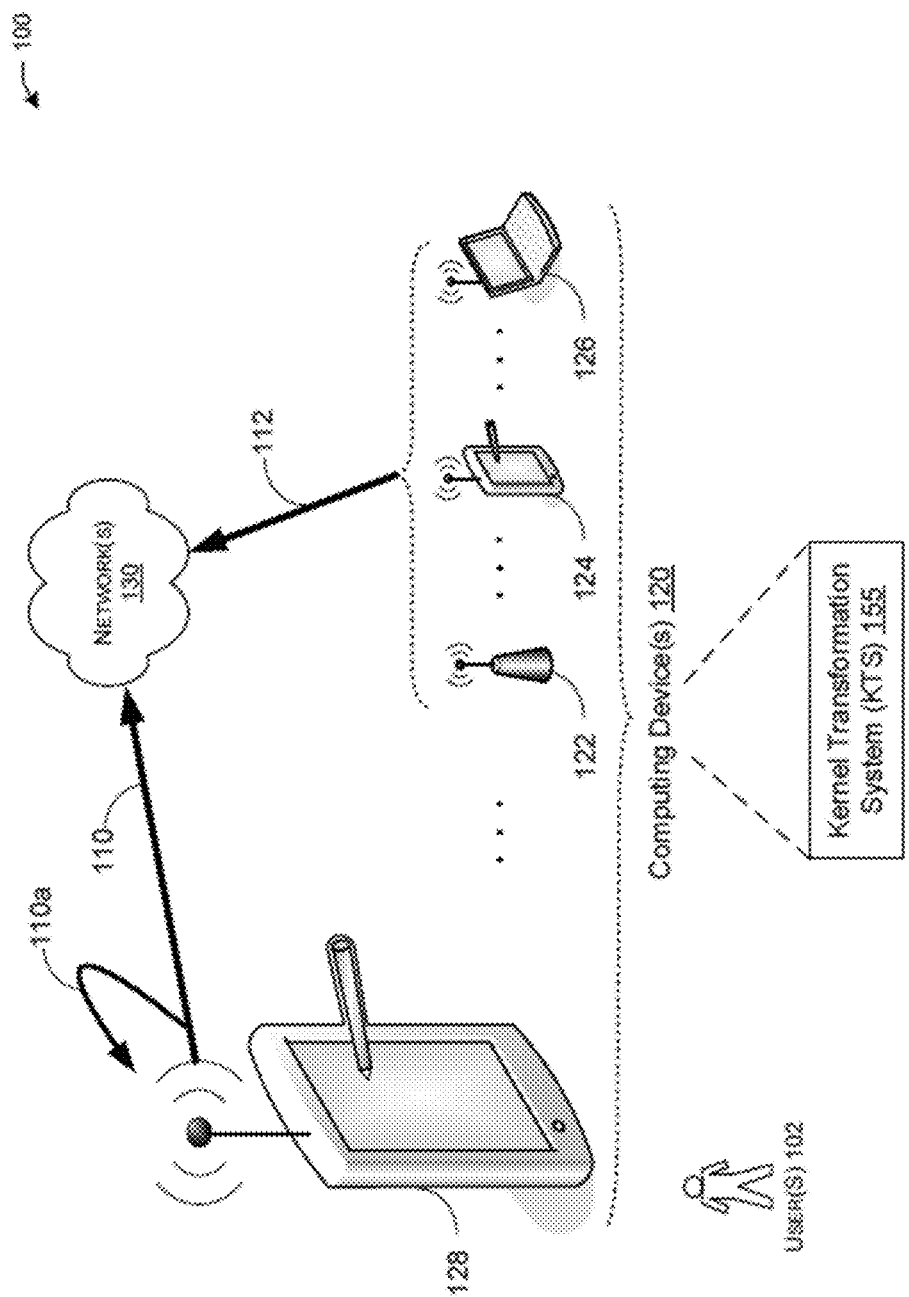
FIG. 1 depicts an illustrative schematic diagram between components of an illustrative echo cancellation system, in accordance with one or more example examples of the present disclosure.

The following description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

As used herein, a "circuit" may be understood as any kind of a logic implementing entity, which may be special purpose circuitry or a processor executing software stored in a memory, firmware, and any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, e.g., any kind of computer program, for example, a computer program using a virtual machine code, e.g., Java. Any other kind of implementation of the respective functions which will be described in more detail below may also be understood as a "circuit". It may also be understood that any two (or more) of the described circuits may be combined into one circuit.

As used herein, a "cell", in the context of telecommunications, may be understood as a sector served by a base station. Accordingly, a cell may be a set of geographically co-located antennas that correspond to a particular sector of a base station. A base station may thus serve one or more "cells" (or "sectors"), where each cell is characterized by a distinct communication channel. An "inter-cell handover" may be understood as a handover from a first "cell" to a second "cell", where the first "cell" is different from the second "cell". "Inter-cell handovers" may be characterized as either "inter-base station handovers" or "intra-base station handovers". "Inter-base station handovers" may be understood as a handover from a first "cell" to a second "cell", where the first "cell" is provided at a first base station and the second "cell" is provided at a second, different, base station. "Intra-base station handovers" may be understood as a handover from a first "cell" to a second "cell", where the first "cell" is provided at the same base station as the second "cell". A "serving cell" may be understood as a "cell" that a mobile terminal is currently connected to according to the mobile communications protocols of the associated mobile communications network standard. Furthermore, the term "cell" may be utilized to refer to any of a macrocell, microcell, picocell, or femtocell, etc.

The term "base station", used in reference to an access point of a mobile communications network, may be understood as a macro-base station, micro-base station, Node B, evolved Node B (eNodeB, eNB), Home eNodeB, Remote Radio Head (RRH), or relay point, etc.

One or more example embodiments discussed herein relate to systems, methods, and devices for echo cancellation using kernel transformation between the transmit and receive chains of a computing device.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The word "exemplary" is used herein to mean "serving as an example, instance, or illustration". Any embodiment described herein as "exemplary" is not necessarily to be construed as preferred or advantageous over other embodiments. The terms "computing device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating", when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multistandard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infra-Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee®, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

FIG. 1 is an illustrative schematic diagram between components of an illustrative echo cancellation system 100, in accordance with one or more examples of the present disclosure. The echo cancellation system 100 may include one or more computing devices 120, which may communicate in accordance with wireless communication techniques.

One or more illustrative computing device(s) 120 may be operable by one or more user(s) 102. The computing device(s) 120 (e.g., computing devices 122, 124, 126, and 128) may include any suitable processor-driven computing device including, but not limited to, a desktop computing device, a laptop computing device, a server, a router, a switch, an access point, a smartphone, a tablet, wearable wireless device (e.g., bracelet, watch, glasses, ring, etc.) and so forth.

The computing device(s) 120 may be mobile devices that are non-stationary or may be stationary devices, such as a base station, an access point, which may have a fixed location. The computing device(s) 120 may be communicatively connected through one or more communication networks 130. The computing device 120 may include one or more kernel transformation system(s) 155 (KTS 155). In some examples, the computing device(s) 120 can include one or more computer systems similar to that of the computer system 1200 described herein with regard to at least FIG. 7.

In one example, one or more computing device(s) 120 may send and receive signals (e.g., signals 110 and 112) to each other directly or through the network(s) 130. For example, the computing device 128 may send signal 110 in accordance with Wi-Fi communication techniques. The signal 110 may be intended for one or more computing devices 122, 124, or 126. One of the computing devices 120 may send signal 112 in accordance with one or more wireless communication techniques, such as LTE, which may be intended for computing device 128. Therefore, computing device 128 may send signal 110 and may receive signal 112. The signal 110 sent from computing device 128 may introduce leakage (or echoes) into the transmit and receive chains, i.e., spectral regrowth due to the non-linear signal from the power amplifier (PA) in the transmit chain will interfere with the desired receive signal in the Rx band. The transmit chain ("Tx chain") may include one or more hardware components utilized during transmission of signals and the receive chain ("Rx chain") may include one or more hardware components utilized during reception of signals. Some examples of these components may be digital to analog converters, analog to digital converters, rectifiers, amplifiers, and/or filters.

In the example of FIG. 1, the signal 110 may generate leakage or echo in the Rx chain of computing device 128 such that the leakage or echo may be treated as a received signal (e.g., signal 110a). The Rx chain of the computing device 128 may attempt to decode the signal 110a. The signal 110a may also interfere with the received LTE signal 112. Therefore, computing device 128 may receive a signal 110a due to leakage or echo and may receive signal 112 from an LTE source at one time. In case there is an overlap in frequency, or the difference in frequency is below a threshold between the two signals 110a and 112, the signal 110a may cause interference with the signal 112. A threshold difference may be determined by factors such as tolerance of one or more hardware components of a computing device, determined from the used wireless protocol, set by an administrator, or the like. For example, although the LTE signals and Wi-Fi signals may operate at different frequencies, if the frequency separation between the signal 112 and 110a is not significant, the signal 110a may cause interference with signal 112. On the other hand, if the frequency separation between the signal 112 and 110a is above the threshold difference in frequency, the signal 110a may not cause interference with the signal 112.

In one or more examples, the KTS 155 may be configured to model or simulate a signal that may cancel out an echo signal that may be processed through the Rx chain of a computing device 120. The KTS 155 may re-generate non-linear terms in the digital domain by whitening kernels using Cholesky decomposition or Gram-Schmidt orthogonalization to achieve orthogonal kernels, which may lead to a reduction in PAPR of the kernels. The KTS 155 may generate the kernels at a high sampling frequency to minimize aliasing (especially for high order kernels). The KTS 155 may employ decimators in order to allow the sampling rate of the generated kernels and the received signal and the adaptive filters 210 to be equivalent.

In one example, the computing device 128 may need to minimize or eliminate the echo processed through the Rx chain. Doing so may minimize or eliminate possible interferences with received signals that may be within a certain threshold of frequency separation. In one example, the signal 110a may be demodulated through the Rx chain of computing device 128 and may result in a demodulated echo signal. In one example, the demodulated echo signal may be compared to a signal generated by the KTS 155 on computing device 128. The demodulated echo signal and the signal generated by the KTS 155 may cancel each other or otherwise come close to canceling each other. Therefore, the impact of the echo or leakage signal 110a may be minimized or eliminated.

In one example, the Tx chain may be used to prepare a signal for transmission. A representation of a transmitted signal 110 may be regenerated by the KTS 155 in order to process it by performing frequency shift, Kernel generation, decimation, transformation, and summation of the resulting signal with the received echo signal 110a. The KTS 155 may utilize the generated signal to cancel out the signal 110a that may be processed through the Rx chain of the computing device 128.

Kernels may be a linear representation of complex data. Kernels may be defined as functions that return inner products between data points in some space. For example, a kernel function may be to embed data in a vector space and to look for linear relations in such vector space. A kernel function may transform a set of complex relations into simplified relations for easy detection. For example, a data set x having one or more variables, may have a linear kernel representation K, e.g., $x \rightarrow \phi(x)$, where $\phi(x)$ includes the kernels for the input data set x. In another example, a polynomial kernel representation K of two vectors $x=(x_1,x_2)$ and $z=(z_1,z_2)$ may be a set of two kernels $\phi(x)$ and $\phi(z)$, as follows:

$$K(x,z) = \langle x,z \rangle^2 = \langle (x_1^2, x_2^2\sqrt{2}x_1, x_2), (z_1^2, z_2^2\sqrt{2}z_1, z_2) \rangle = \langle \phi(x), \phi(z) \rangle$$

In one example, "whitening" kernels may be transforming kernels of a data set into a new set of kernels that may result in orthogonality and a lower peak average power ratio (PAPR). A whitening transformation may be a transformation of a set of correlated random variables into a set of new random variables that may be uncorrelated. PAPR may introduce problems in various wireless communication systems, for example, systems using multi-carrier modulation techniques like OFDM. High PAPR may reduce the efficiency of the adaptive filters of a computing device.

In some examples, The KTS 155 may re-generate non-linear terms in digital domain by whitening kernels using Cholesky decomposition or Gram-Schmidt orthogonalization to achieve orthogonal kernels, which may lead to a reduction in PAPR of the kernels. Cholesky decomposition or factorization may also be referred to as "square root method". The Cholesky factorization is a triangular decomposition. For example, a Cholesky decomposition of a matrix A finds a triangular matrix U that, if multiplied by its own transpose (e.g., $U^T$), leads back to matrix A.

A Gram-Schmidt orthogonalization of a matrix A may construct a matrix Q such that the columns of Q are orthonormal to each other and span the same space as the columns of the matrix A. For instance, matrix A may be expressed as matrix Q multiplied by another matrix R, where Q is an orthogonal matrix and R is an upper triangle matrix.

A square matrix is called lower triangular if entries above the main diagonal are zero, while a square matrix is called upper triangular if entries below the main diagonal are zero.

In one example, as transmit signal (e.g., 110a) arrives at the Rx chain of the computing device 128, the transmit signal 110a may be considered as echoes or leakage. This may interfere with signals that may have been intended for the computing device 128, such as signal 112. The spectral regrowth due to non-linearity in PAs in the Tx chain of a computing device 120 may interfere with an intended, or received, signal in the Rx chain. The non-linear terms may be re-generated in the digital domain by whitening kernels using Cholesky decomposition or Gram-Schmidt orthogonalization to achieve orthogonal kernels, which may also lead to a reduction in PAPR of the kernels.

Any of the communications networks may include, but may not be limited to, any one or a combination of different types of suitable communications networks such as, for example, broadcasting networks, cable networks, public networks (e.g., the Internet), private networks, wireless networks, cellular networks, or any other suitable private and/or public networks. Further, any of the communications networks (e.g., network(s) 130) may have any suitable communication range associated therewith and may include, for example, global networks (e.g., the Internet), metropolitan area networks (MANs), wide area networks (WANs), local area networks (LANs), or personal area networks (PANs). In addition, any of the communications networks (e.g., network(s) 130) may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of computing device(s) 120 may include one or more communications antenna. Communications antenna may be any suitable type of antenna corresponding to the communications protocols used by the computing device(s) 120. Some non-limiting examples of suitable communications antennas include Wi-Fi antennas, IEEE 802.11 family of standards compatible antennas, directional antennas, non-directional antennas, dipole antennas, folded dipole antennas, patch antennas, MIMO antennas, or the like. The communications antenna may be communicatively coupled to a radio component to transmit and/or receive signals, such as communications signals to and/or from the computing devices(s) 120. Any of the computing device(s) 120 may include any suitable radio and/or transceiver for transmitting and/or receiving radio frequency (RF) signals in the bandwidth and/or channels corresponding to the communications protocols utilized by any of the computing device(s) 120 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the IEEE 802.11 standards. In certain examples, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad) or any other 802.11 type channels (e.g., 802.11ax). In some examples, non-Wi-Fi protocols may be used for communications between devices, such as Bluetooth, dedicated short-range communication (DSRC), Ultra-High Frequency (UHF), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Figure 2:
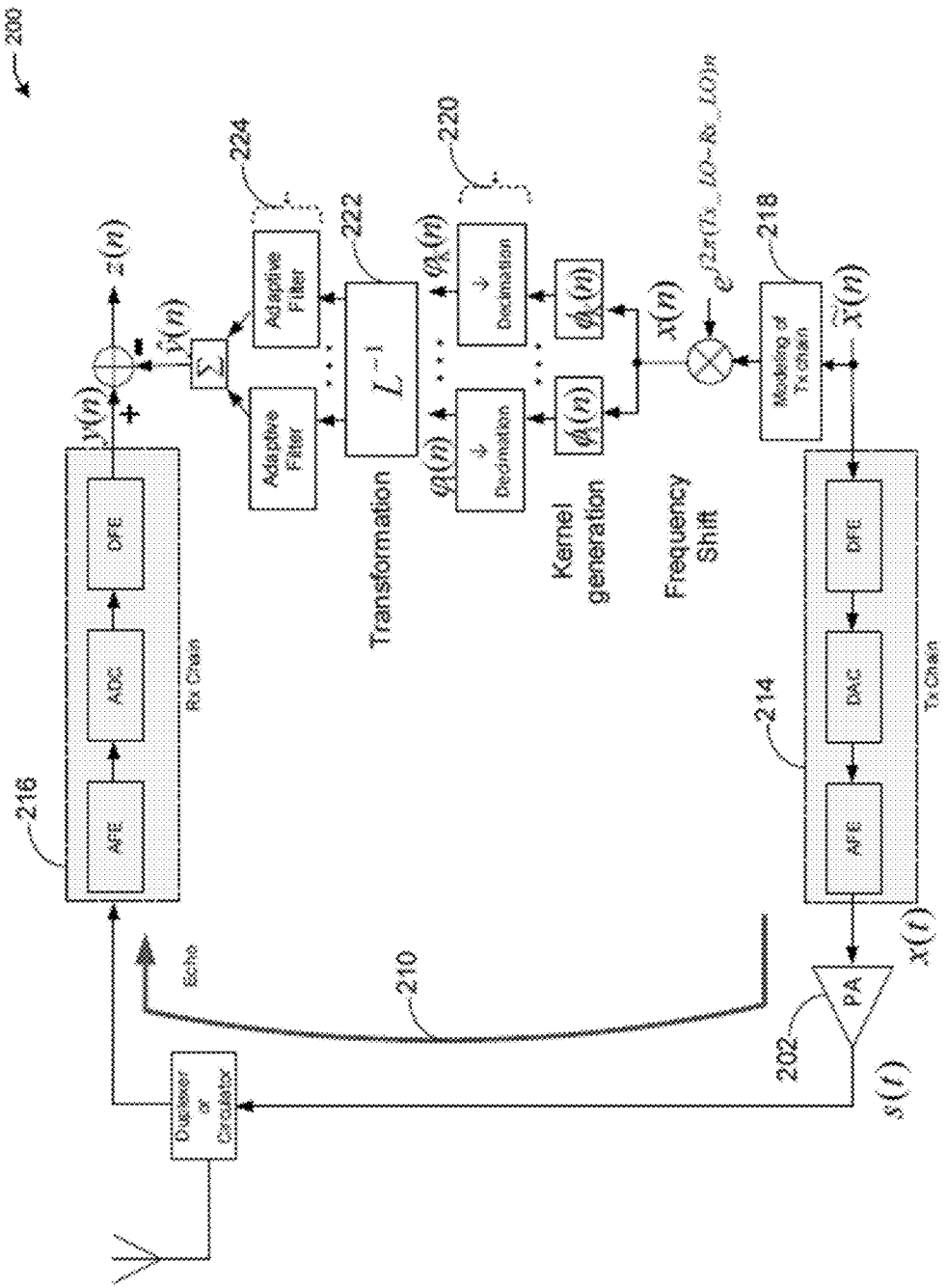
FIG. 2 depicts an illustrative schematic diagram between components of an illustrative echo cancellation system, in accordance with one or more example examples of the present disclosure.

FIG. 2 depicts an illustrative schematic diagram between components of an illustrative echo cancellation system 200, in accordance with one or more examples of the present disclosure. The echo cancellation system 200 may contain one or more hardware components to perform the operations of transmitting and/or receiving signals, e.g., signals 110, 110a and/or 112. The echo cancellation system 200 may contain a Tx chain, e.g., 214, and an Rx chain, e.g., 216. The Tx chain 214 may contain at least one rectifier, such as diode front end (DFE), active front end (AFE), and/or digital to analog convertor (DAC). The Rx chain 216 may contain at least one of AFE, DFE, and/or analog to digital converter (ADC).

In one example, the echo signal 210 generated from the Tx chain 214 may be re-generated in time (e.g., ŷ(n)) and may be subtracted from the received signal. The received signal (e.g., y(n)) may be a signal associated with the echo signal 210 after being processed by the Rx chain 216. Signal z(n) may represent the residual signal after the subtraction of signal y(n) and ŷ(n).

In one example, the non-linear terms may be re-generated in the digital domain when the transmit signal X(n) in digital baseband is sufficiently oversampled where X(n) is a complex baseband representation of the input x(t) to the PA 202. The output s(t) of the PA 202 may be represented in complex baseband digital domain s(n). The complex baseband representation of the output of the PA 202 can be decomposed by multiple kernels $\phi_k(n)$ with complex scaling factor $a_k$ $$s(n)=\Sigma_{k=1}^{\infty} a_k \phi_k(n)$$

There may be various possible kernels such as $\phi_k(n)=X^*(n)|X(n)|^{k-1}$ and $\phi_k(n)=X^p(n)|X(n)|^{k-1-p}$, where superscript "*" represents the complex conjugate and p is a parameter.

In one example, in order to re-generate the kernels, KTS 155 may model the Tx chain 216, e.g., 218, to process a similar signal to what would be transmitted in order to achieve echo cancellation (with orthogonal kernels and a low PAPR). Therefore, the transmission chain may be modelled by filters; in addition, frequency shift may be taken into account, thus creating signal x(n), which may be close to X(n). In other words, the Tx chain may be modeled in digital baseband, and up/down frequency conversion may be utilized in order to include full duplex as well as frequency-division duplexing (FDD). For example, the KTS 155 may shift the frequency of the outputs of the Tx chain model 218 by $e^{j2\pi(Tx\_LO-Rx\_LO)n}$, where Tx_LO is the transmit carrier frequency in Hz and Rx_LO is the receive carrier frequency in Hz.

In one example, the KTS 155 may utilize decimators 220 in order to allow the sampling rates of the generated kernels, the received signal, and the adaptive filters 224 to be equivalent. Decimation may be the process of reducing the sampling rate of a signal. Decimation may utilize filtering to mitigate aliasing distortion, which may occur when downsampling a signal. A system component that performs decimation is called a decimator. For example, the KTS 155 may generate the kernels at a high sampling frequency to minimize aliasing (especially for high order kernels). Since the received signal and adaptive filter(s) 224 are running a much lower sampling rate than kernel generation, decimators may be applied. The auto-correlation matrix of kernels after decimation, (e.g., input to the adaptive filters 224) may be calculated as follows:

$$R=E\{\Phi\Phi^H\}$$

where $\Phi=[\phi_1(n) \ldots \phi_k(n)]^T$

From the definition of kernels, it is clear they are correlated. For whitening the adaptive filter inputs over kernels (not whitening in time), $R^{-1/2}$ may be used by Singular Value Decomposition (SVD) or the eigenvector of R. However, utilizing SVD or eigenvectors may not result in an improved PAPR after whitening.

In one example, at the transformation block 222, the KTS 155 may apply a Cholesky decomposition to the kernels in order to improve PAPR as follows:

$R=LL^H$ where L is a lower triangular matrix and H is a conjugate transpose.

Then, the kernels may be transformed using the inverse matrix of L:

$$\Psi=[\phi_1(n) \ldots \phi_k(n)]^T$$

This may result in the new kernels being uncorrelated.

Due to transformation via the lower triangular matrix, kth new kernel $\Psi_k(n)$ may be a function of $\phi_1(n), \ldots, \phi_k(n)$ unlike orthogonalization by eigenvectors or SVD where the transform matrix may not be a triangular matrix. The kernel $\phi_k(n)$ may have a higher PAPR with higher order. When the input signal to the adaptive filter has higher PAPR, the adaptive algorithm will have slower convergence or more chance of divergence. When orthogonalization by eigenvectors or SVD is applied, the new kernel will be a linear combination of all orders of $\phi_k(n)$. Hence, even the first order $\Psi_1(n)$ will have higher PAPR than the old kernel.

In one example, the old kernels may be transformed by a lower triangular matrix. Hence, reducing the PAPR of kernels may help the convergence behavior and mean squared error (MSE) while maintaining orthogonality of new kernels. For easier understanding, this method may be better understood by the Gram-Schmidt process. For example, $$\Psi_1(n) = \varphi_1(n)$$
$$\Psi_2(n) = \varphi_2(n) - a\varphi_1(n)$$
$$\ldots$$
$$\text{where } a = \frac{\langle \varphi_1(t), \varphi_2(t) \rangle}{|\varphi_1|^2}$$

$\Psi_1(n)$ and $\Psi_2(n)$ are uncorrelated and $\Psi_2(n)$ is a function of $\phi_1(n)$ and $\phi_2(n)$. Hence, $\Psi_2(n)$ may not contain information associated with $\phi_1(n)$ because $\phi_1(n)$ is subtracted out of the $\Psi_2(n)$ function. Thus, $\Psi_2(n)$ may have less entropy than $\phi_2(n)$, yielding less PAPR than $\phi_2(n)$.

By using the lower triangular matrix (or, e.g., the Gram-Schmidt process), orthogonal kernels may be obtained, in addition to a lower PAPR. After the transformation block 222, the transformed kernels may pass through adaptive filters 224 resulting in one or more outputs. A summation of the one or more outputs may result in a message ŷ(n) that may be subtracted from y(n) in order to reduce the echo or leakage effect. This may result in a residual signal z(n).

Figure 3A:
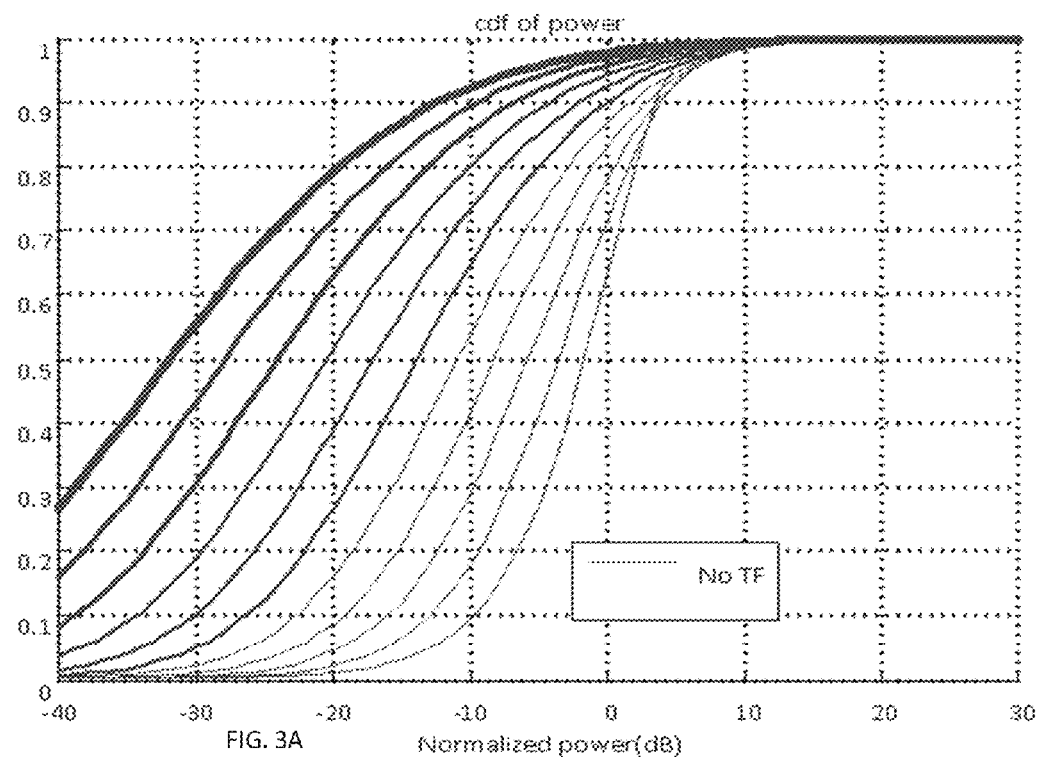
FIG. 3A depicts the peak average power ratios with the transformation for an echo cancellation system, in accordance with one or more examples of the disclosure.
Figure 3B:
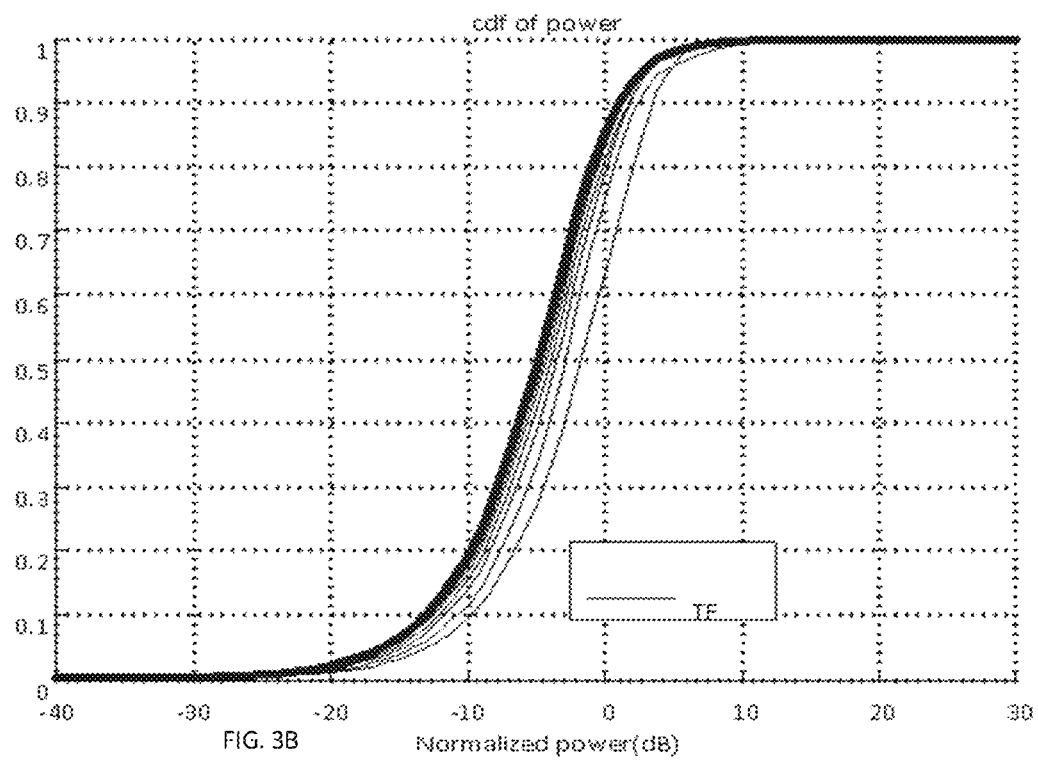
FIG. 3B depicts the peak average power ratios without the transformation for an echo cancellation system, in accordance with one or more examples of the disclosure.

FIG. 3A depicts non-transformed kernels with a corresponding PAPR in an echo cancellation system. Lower order kernels are depicted by thin lines and higher order kernels are depicted by thicker lines. As may be seen in FIG. 3A, as the order of the kernel increases, the PAPR correspondingly increases. In contrast, as can be seen in the transformed kernels and corresponding PAPR in FIG. 3B, after transformation, as the order of the kernel increases, the PAPR remains relatively similar to the PAPR of the first order kernel. The low PAPR kernels may be advantageous for echo cancellation.

FIGS. 4A and 4B depict residual interferences without and with the transformation for an echo cancellation system respectively, in accordance with one or more examples of the present disclosure.

For example, FIGS. 4A and 4B show the residual interferences as adaptive filters 224 converge when Tx and Rx carriers have 20 MHz offset. In this example the least mean squares (LMS) is applied for adapting the weights and 11 kernels are used. As can be seen, without transformation (e.g., FIG. 4A), the residual interference power is large and has greater variance. Lower order kernels have more power. Hence, as these lower order kernels are removed, higher order kernels become more dominant. However, higher order kernels have much higher PAPR. On the other hand, with kernel transformation using KTS 155, as shown in FIG. 4B, very stable convergence is observed with less MSE due to the transformation by the KTS 155, which reduces the PAPR even at high order kernels.

Figure 5:
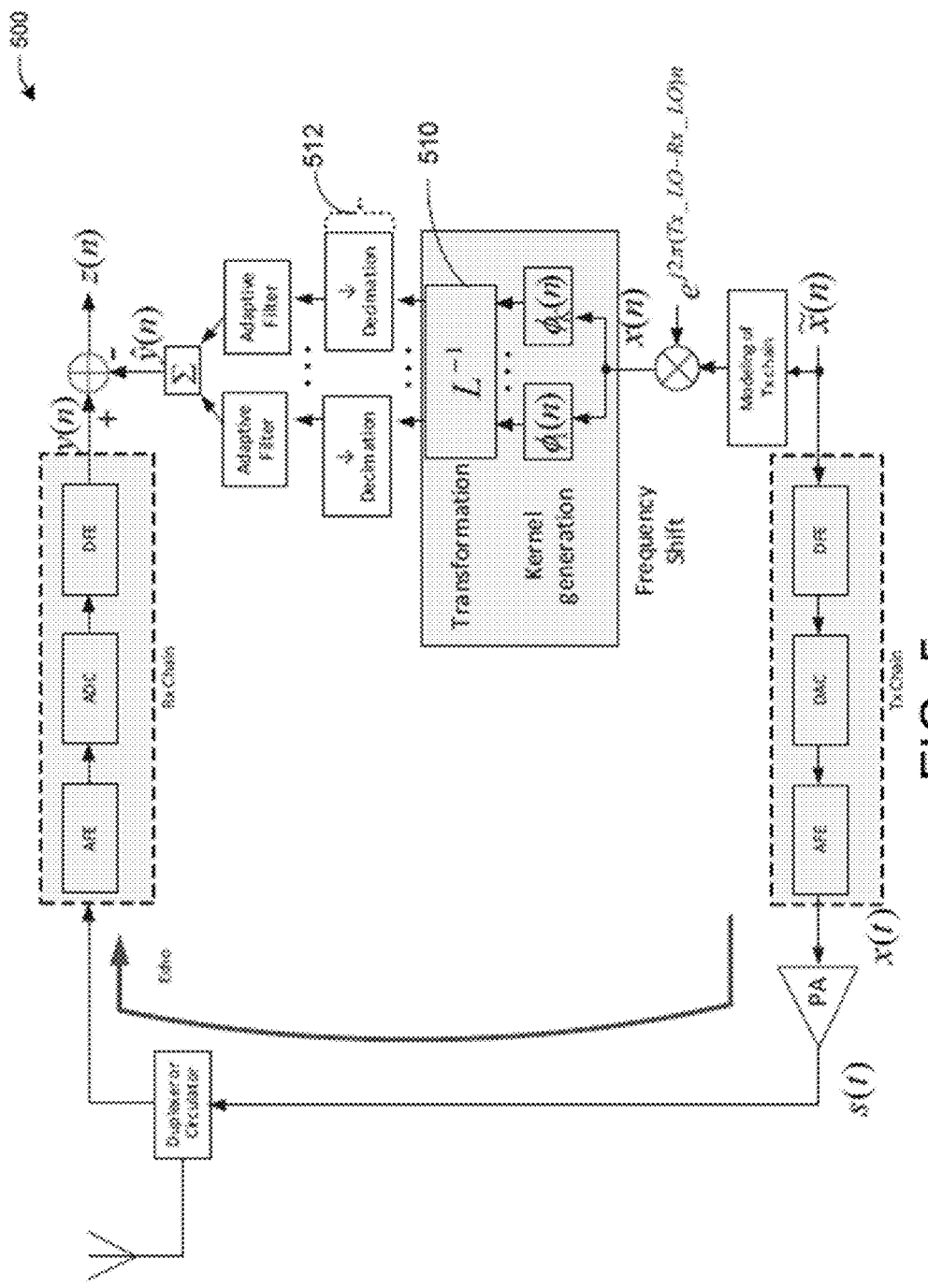
FIG. 5 depicts an illustrative schematic diagram between components of an illustrative echo cancellation system, according to one or more example examples of the present disclosure.

FIG. 5 depicts an illustrative schematic diagram between components of an illustrative echo cancellation system, according to one or more examples of the present disclosure.

In one example, as illustrated in FIG. 5, kernel transformation according to KTS 155 may occur prior to decimation, as may be seen in block 510. Block 510 may include a look-up table containing pre-calculated values for $L^{-1}$. Pre-calculated values for $L^{-1}$ may be provided beforehand in a look-up table, e.g., in memory, rather than contemporaneously calculating a value for $L^{-1}$, i.e., $L^{-1}$ values may be generated prior to transformation and stored in memory as a look-up table. Performing transformation prior to decimation, as illustrated in FIG. 5, may involve complex calculations. Performing transformation 222 after decimation 220, as illustrated in FIG. 2 above, may be simpler, however, when transformation 222 is also implemented via look-up table, it may require more memory, e.g., a larger look-up table. For example, transformation 222 may be a function of the difference of Tx_LO and Rx_LO, so, depending on the band utilized, e.g., various Wi-Fi bands, multiple transformation matrices, e.g., $L^{-1}$ may have to be pre-calculated for all frequency scenarios, e.g., for all Tx_LO and Rx_LO difference pairs, which would lead to a larger look-up table. Therefore, to reduce complexity, transformation 222 may be performed before decimation (which may be implemented via look-up table).

The one or more examples may be applicable to in-band full duplex, as well as FDD systems, for cancellation of non-linear distortion in the Rx chain (as illustrated in FIG. 5). In addition, Wi-Fi or Bluetooth transmissions, e.g., out-of-band emissions, that may interfere with an intended received signal, e.g., an LTE signal or any intended signal for reception, may also be cancelled.

Figure 6:
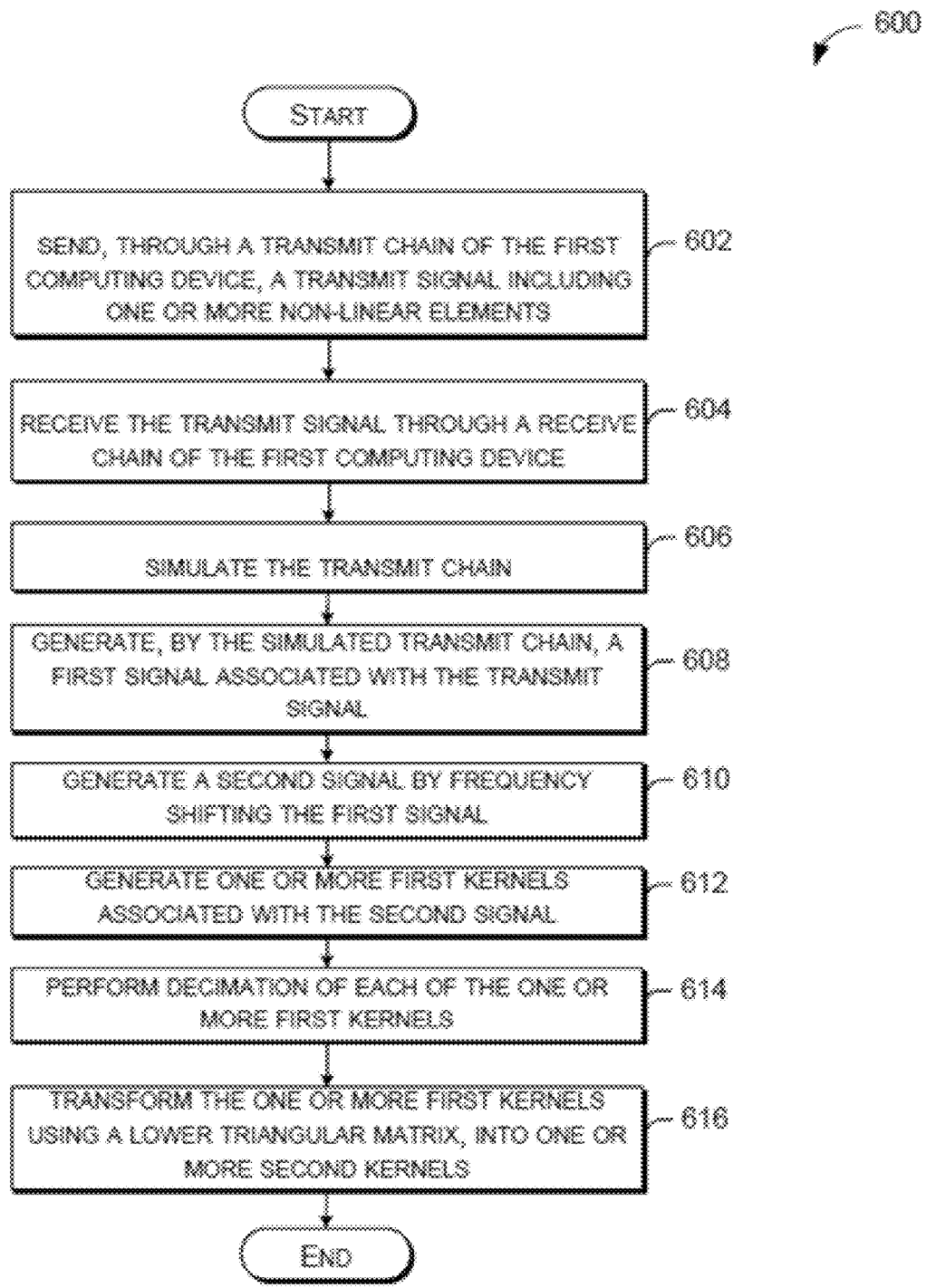
FIG. 6 depicts a flow diagram of an illustrative process 600 for an echo cancellation system in accordance with one or more examples of the disclosure.

FIG. 6 illustrates a flow diagram of illustrative process 600 for a kernel transformation system in accordance with one or more examples of the disclosure.

At block 602, the KTS 155 may send, through a transmit chain of the first computing device, a transmit signal including one or more non-linear elements. At block 604, the KTS 155 may receive the transmit signal through a receive chain of the first computing device.

At block 606, the KTS 155 may simulate the transmit chain. For example, the KTS 155 may be configured to model a signal that may cancel out an echo signal, such as signal 110a that may be processed through the Rx chain of a computing device 120.

At block 608, the KTS 155 may generate, by the simulated transmit chain, a first signal.

At block 610, the KTS 155 may generate a second signal by frequency shifting the first signal. For example, the KTS 155 may frequency shift the outputs of the Tx chain model 218 by $e^{j2\pi(Tx\_LO-Rx\_LO)n}$ where Tx_LO is the transmit carrier frequency in Hz and Rx_LO is the receive carrier frequency in Hz.

At block 612, the KTS 155 may generate one or more first kernels associated with the second signal. For example, the KTS 155 may generate the kernels at a high sampling frequency to minimize aliasing (especially for high order kernels).

At block 614, the KTS 155 may perform decimation of the one or more first kernels. For example, the KTS 155 may employ decimators in order to allow the sampling rate of the generated kernels and the received signal and the adaptive filters 224 to be equivalent.

At block 616, the KTS 155 may transform the one or more first kernels using a lower triangular matrix, into one or more second kernels. For example, the KTS 155 may re-generate non-linear terms in the digital domain by whitening kernels using Cholesky decomposition or Gram-Schmidt orthogonalization to achieve orthogonal kernels, which may lead to a reduction in PAPR of the kernels.

Figure 7:
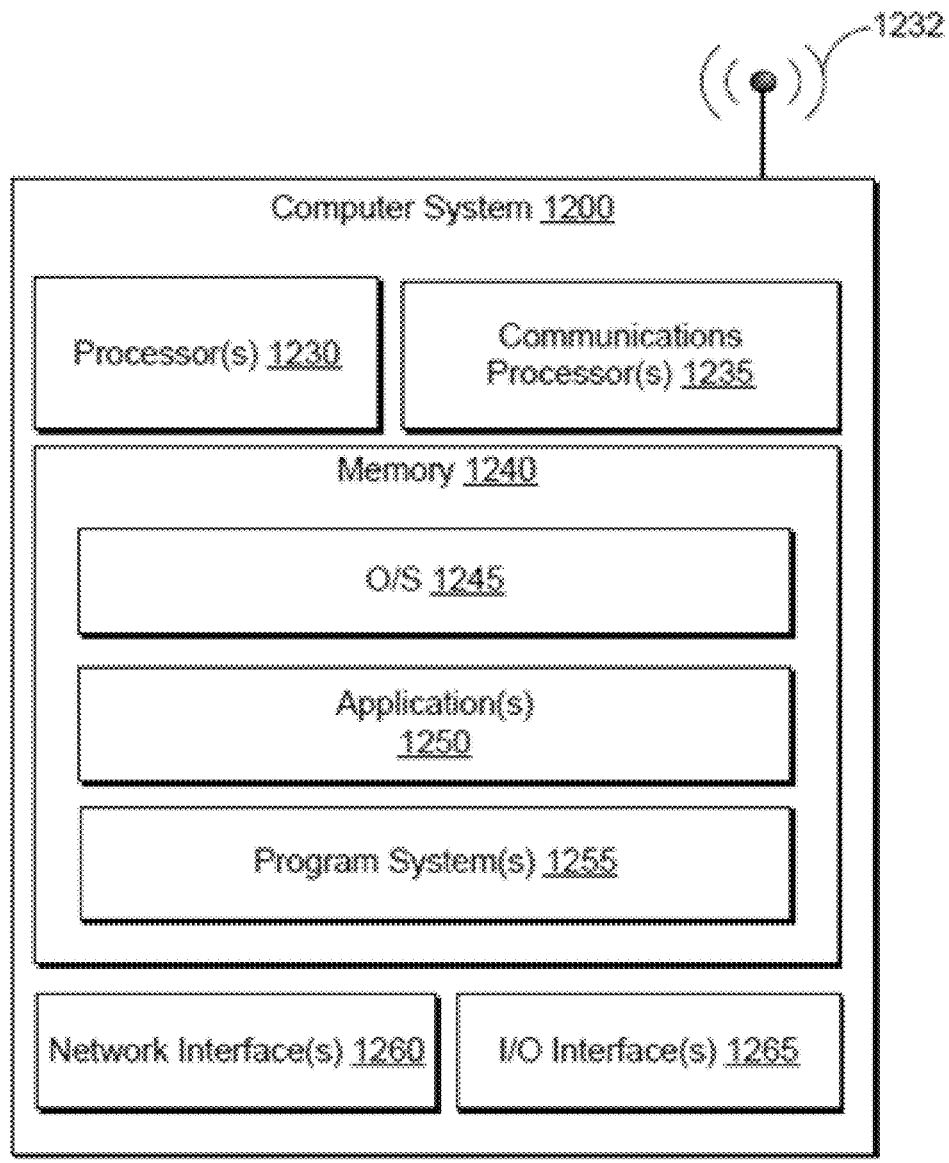
FIG. 7 illustrates an exemplary computer system in accordance with one or more examples.

FIG. 7 is a diagram that illustrates an exemplary computer system 1200 in accordance with one or more examples.

The computer system 1200 may include one or more processors 1230, one or more communications processors 1235, one or more antennas 1232, and/or one or more memories 1240. The computer system 1200 may include one or more modules that may process signal transmission packets to decode and analyze one or more fields included in the signal transmission packets.

As depicted herein, the processors 1230 may be configured to operate instructions, applications, modules, and/or software associated with services provided by the computer system 1200. These instructions, applications, modules, and/or software may be stored on the memory 1240, depicted as one or more operating systems (O/S) 1245, application(s) 1250, and/or program module(s) 1255 may be retrievable and executable by the processors 1230 and communication processor(s) 1235. Alternatively, the instructions, applications, modules, and/or software executed by the processors 230 may be stored in any suitable location, such as the cloud or other remote locations. The instructions, applications, and/or software modules, such as O/S 245, application(s) 1250, and/or program module(s) 1255 may or may not correspond to physical locations and/or addresses in the memory 1240. In other words, the contents of each of the modules may not be segregated from each other and may be in fact stored in at least partially interleaved positions on the memory 1240.

The processor(s) 1230 may include, without limitation, a central processing unit (CPU), a digital signal processor (DSP), a reduced instruction set computer (RISC), a complex instruction set computer (CISC), or any combination thereof. The computer system 1200 may also include a chipset (not shown) for controlling communications between the processor(s) 1230 and one or more of the other components of the computer system 1200. In one example, the computer system 1200 may be based on an Intel® Architecture system, and the processor(s) 1230 and the chipset may be from a family of Intel® processors and chipsets, such as the Intel® Atom™ processor family. The processor(s) 1230 may also include one or more processors as part of one or more application-specific integrated circuits (ASICs) or application-specific standard products (ASSPs) for handling specific data processing functions or tasks.

The one or more antennas 1232 may be any suitable antenna for wireless communications. In some cases, the one or more antennas 1232 may be integrated with one of the communications processors 1235, the processors 1230, or any other elements of the computer system 1200. The one or more antennas 1232 may be any suitable type of antenna corresponding to the communications protocols used by the computer system 1200. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the computer system 1200.

The communications processor(s) 1235 may be configured to communicate with the processor(s) 1230 or other elements of the computer system 1200 to transmit and/or receive communications signals via any suitable communications mechanism, link, channel, or standard. The communications processor 1235 may be configured to receive a communications signal and appropriately modulate, or otherwise transform the signal and provide the signal to the antenna 1232 for transmission via wireless channels, such as Wi-Fi. The communications processors 1235 may further be configured to receive communications signals from the antenna 1232 and demodulate, or otherwise transform, the received signals, and provide the transformed signals to the processors 1230 for further processing and/or storage. In certain aspects, the communications processors 1235 may enable communications using a variety of modulation schemes, standards, and channels. In some cases, the communications processors 1235 may be a separate element from the processors 1230 and, in other cases, the communications processors 1235 may be integrated with the processors 1230.

The memory 1240 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The memory 1240 may include a non-transitory computer-readable storage medium having program instructions stored thereon that are executable by the processor(s) 1230 and/or communication processor(s) 1235 to cause the functional operations (e.g., methods/routines/processes) described herein. The program instructions may include one or more application(s) 1250 and/or program module(s) 1255 that are executable by the processor(s) 1230 and/or communication processor(s) 1235 to provide some or all of the functionality described herein, including process 600. The program instructions may include, for example, the program module(s) 1255 that may be executed on a computing device 120 (e.g., for performing some or all of the operational aspects described herein with regard to KTS 155 of FIG. 1).

The O/S 1245 may be configured to enable the operation of the one or more application(s) 1250 and/or program module(s) 1255 on the processors 1230 and/or communication processor(s) 1235. In one aspect, the O/S 1245 may provide a common interface for the application(s) 1250 and/or the program module(s) 1255 to interface with, utilize, and/or control the various hardware elements of a computer system 1200. The details of operating systems (e.g., O/S 1245) are well known in the art. Example operating systems O/S 1245 may include, but are not limited to, Android™, Apple® iOS, Microsoft® Windows Phone®, Microsoft® Windows®, or the like.

The computer system 1200 may further include network interface(s) 1260 that facilitate communication between one or more computer system(s) 1200. The computer system 1200 may additionally include one or more input/output (I/O) interfaces 1265 (and optionally associated software components such as device drivers) that may support interaction between a user 102 and a variety of I/O devices, such as a keyboard, a mouse, a pen, a pointing device, a voice input device, a touch input device, a display, speakers, a camera, a microphone, a printer, and so forth.

The following examples pertain to further aspects of the disclosure.

An example 1 discloses a method for echo cancellation which may include: sending, by a first computing device comprising one or more processors and one or more transceiver components, through a transmit chain of the first computing device, a transmit signal including one or more non-linear elements; receiving, by the first computing device, at least a portion of the transmit signal through a receive chain of the first computing device; generating, by a simulated transmit chain, an echo cancellation signal associated with the transmit signal; subtracting, by the first computing device, the echo cancellation signal from the received at least a portion of the transmit signal.

Example 2 may include the method of example 1, further including: simulating, by the first computing device, the transmit chain; generating, by the first computing device, a second signal by frequency shifting a first signal; and generating, by the first computing device, one or more first kernels associated with the second signal.

Example 3 may include the method of example 2, further including: performing, by the first computing device, decimation of the one or more first kernels; transforming, by the first computing device, the one or more first kernels using a lower triangular matrix, into one or more second kernels; and combining, by the first computing device, the one or more second kernels to generate the echo cancellation signal.

Example 4 may include the method of example 3, wherein the one or more first kernels are transformed using an inverse of the lower triangular matrix.

Example 5 may include the method of example 3, wherein transforming the one or more first kernels includes applying a Cholesky decomposition to the one or more first kernels.

Example 6 may include the method of example 3, further including: providing a look-up table for one or more second kernels.

Example 7 may include the method of example 5, wherein the look-up table for one or more second kernels corresponds to a transformation of the one or more first kernels.

Example 8 may include the method of claim 3, further including: wherein the first signal is frequency shifted by $e^{j2\pi(Tx\_LO-Rx\_LO)n}$ where Tx_LO is a transmit carrier frequency in Hz and Rx_LO is a receive carrier frequency in Hz.

Example 9 may include the method of example 3, wherein decimation includes reducing a sampling rate of the one or more first kernels.

Example 10 may include the method of example 3, further including: summing one or more outputs of one or more adaptive filters.

Example 11 may include the method of example 2, further including: transforming the one or more first kernels using a lower triangular matrix, into one or more second kernels; and performing decimation of the one or more second kernels; combining the one or more second kernels to generate the echo cancellation signal.

Example 12 may include the method of example 11, further comprising: providing a look-up table for one or more second kernels.

Example 13 may include the method of example 12, wherein the look-up table for one or more second kernels corresponds to a transformation of the one or more first kernels.

Example 14 may include the method of example 11, wherein the one or more first kernels are transformed using an inverse of the lower triangular matrix.

Example 15 may include the method of example 11, wherein transforming the one or more first kernels includes applying a Cholesky decomposition to the one or more first kernels.

Example 16 may include the method of example 11, further including: wherein the first signal is frequency shifted by $e^{j2\pi(Tx\_LO-Rx\_LO)n}$ where Tx_LO is a transmit carrier frequency in Hz and Rx_LO is a receive carrier frequency in Hz.

Example 17 may include the method of example 11, wherein decimation includes reducing a sampling rate of the one or more first kernels.

Example 18 may include the method of example 11, further includes: summing one or more outputs of one or more adaptive filters.

Example 19 may include the method of example 2, wherein the one or more first kernels are linear representation of the second signal.

Example 20 may include the method of examples 3 or 11, wherein the one or more second kernels are a linear combination of the one or more first kernels.

Example 21 may include the method of example 1, further including: regenerating, by the first computing device, the transmit signal in digital domain.

Example 22 may include the method of example 1, wherein the transceiver operates in a full duplex system.

Example 23 may include the method of example 1, wherein the transceiver operates in a frequency-division duplex system.

Example 24 may include the method of example 1, wherein the transceiver operates in a time-division duplex system.

Example 25 may include the method of example 1, wherein the transmit signal is a wireless local area network transmission.

Example 26 may include the method of example 1, wherein the transmit signal is a Bluetooth signal.

Example 27 may include the method of example 1, wherein the transmit signal is a near field communication signal.

Example 28 may include the method of example 1, wherein the transmit signal is a radio-telephone communication system signal.

Example 29 may include the method of example 1, wherein the transmit signal is an uplink signal according to a communication protocol configured for a second antenna in the first computing device.

Example 30 may include the method of example 2, wherein the simulation of the transmit chain comprises computer-executable instructions to: simulate conversion of the transmit signal and simulate power amplification of the transmit signal.

Example 31 may include the method of example 30, wherein conversion of the transmit signal models at least one of: a diode front end, an active front end, and a digital-to-analog converter.

An example 32 discloses a computing device, which may include: a transceiver configured to transmit and receive wireless signals; an antenna coupled to the transceiver; one or more processors in communication with the transceiver; a receive chain of the computing device configured to receive a receive signal that comprises at least a portion of a transmit signal; at least one memory that stores computer-executable instructions; and at least one processor of the one or more processors configured to access the at least one memory, wherein the at least one processor of the one or more processors is configured to execute the computer-executable instructions to: send the transmit signal including one or more non-linear elements; generate, by a simulated transmit chain, an echo cancellation signal associated with the transmit signal; and subtract the echo cancellation signal from the received at least a portion of the transmit signal.

Example 33 may include the computing device of example 32, further including: simulate the transmit chain; generate a second signal by frequency shifting a first signal; and generate one or more first kernels associated with the second signal.

Example 34 may include the computing device of example 33, further comprising: perform decimation of the one or more first kernels; transform the one or more first kernels using a lower triangular matrix, into one or more second kernels; and combine the one or more second kernels to generate the echo cancellation signal.

Example 35 may include the computing device of example 34, wherein the one or more first kernels are transformed using an inverse of the lower triangular matrix.

Example 36 may include the computing device of example 33, wherein transforming the one or more first kernels includes applying a Cholesky decomposition to the one or more first kernels.

Example 37 may include the computing device of example 34, further comprising: at least one further memory that stores a look-up table for one or more second kernels.

Example 38 may include the computing device of example 37, wherein the look-up table for one or more second kernels corresponds to a transformation of the one or more first kernels.

Example 39 may include the computing device of example 34, further including: wherein the first signal is frequency shifted by ej2π(Tx_LO-Rx_LO)n where Tx_LO is a transmit carrier frequency in Hz and Rx_LO is a receive carrier frequency in Hz.

Example 40 may include the computing device of example 34, wherein decimation includes reducing a sampling rate of the one or more first kernels.

Example 41 may include the computing device of example 34, further includes: summing one or more outputs of one or more adaptive filters.

Example 42 may include the computing device of example 33, further including: transform the one or more first kernels using a lower triangular matrix, into one or more second kernels; and perform decimation of the one or more second kernels; combine the one or more second kernels to generate the echo cancellation signal.

Example 43 may include the computing device of example 42, further including: at least one further memory that stores a look-up table for one or more second kernels.

Example 44 may include the computing device of example 43, wherein the look-up table for one or more second kernels corresponds to a transformation of the one or more first kernels.

Example 45 may include the computing device of example 42, wherein the one or more first kernels are transformed using an inverse of the lower triangular matrix.

Example 46 may include the computing device of example 42, wherein transforming the one or more first kernels includes applying a Cholesky decomposition to the one or more first kernels.

Example 47 may include the computing device of example 42, further including: wherein the first signal is frequency shifted by $e^{j2\pi(Tx\_LO-Rx\_LO)n}$ where Tx_LO is a transmit carrier frequency in Hz and Rx_LO is a receive carrier frequency in Hz.

Example 48 may include the computing device of example 42, wherein decimation includes reducing a sampling rate of the one or more first kernels.

Example 49 may include the computing device of example 42, further including: summing one or more outputs of one or more adaptive filters.

Example 50 may include the computing device of example 42, wherein the one or more first kernels are linear representation of the second signal.

Example 51 may include the computing device of examples 34 or 42, wherein the one or more second kernels are a linear combination of the one or more first kernels.

Example 52 may include the computing device of example 32, further including: regenerating, by the first computing device, the transmit signal in digital domain.

Example 53 may include the computing device of example 32, wherein the transceiver operates in a full duplex system.

Example 54 may include the computing device of example 32, wherein the transceiver operates in a frequency-division duplex system.

Example 55 may include the computing device of example 32, wherein the transceiver operates in a time-division duplex system.

Example 56 may include the computing device of example 32, wherein the transmit signal is a wireless local area network transmission.

Example 57 may include the computing device of example 32, wherein the transmit signal is a Bluetooth signal.

Example 58 may include the computing device of example 32, wherein the transmit signal is a near field communication signal.

Example 59 may include the computing device of example 32, wherein the transmit signal is a radio-telephone communication system signal.

Example 60 may include the computing device of example 32, wherein the transmit signal is an uplink signal according to a communication protocol configured for a second antenna in the first computing device.

Example 61 may include the computing device of example 33, wherein the simulation of the transmit chain comprises computer-executable instructions to: simulate conversion of the transmit signal and simulate power amplification of the transmit signal.

Example 62 may include the computing device of example 61, wherein conversion of the transmit signal models at least one of: a diode front end, an active front end, and a digital-to-analog converter.

An example 63 discloses a non-transitory computer-readable medium storing computer-executable instructions which, when executed by a processor, cause the processor to perform operation, which may include: sending a transmit signal including one or more non-linear elements; receiving a receive signal comprising at least a portion of the transmit signal through a receive chain of a first computing device; simulating the transmit chain; generating, by the simulated transmit chain, a first signal associated with the transmit signal; generating a second signal by frequency shifting the first signal; generating one or more first kernels associated with the second signal; performing decimation of the one or more first kernels; transforming the one or more first kernels using a lower triangular matrix, into one or more second kernels; combining the one or more second kernels to generate an echo cancellation signal; and subtracting the echo cancellation signal from the received at least a portion of the transmit signal.

Example 64 may include the non-transitory computer-readable medium of example 63, wherein the one or more first kernels are transformed using an inverse of the lower triangular matrix.

Example 65 may include the non-transitory computer-readable medium of example 63, wherein transforming the one or more first kernels includes applying a Cholesky decomposition to the one or more first kernels.

Example 66 may include the non-transitory computer-readable medium of example 63, further including: providing a look-up table for one or more second kernels.

Example 67 may include the non-transitory computer-readable medium of example 66, wherein the look-up table for one or more second kernels corresponds to a transformation of the one or more first kernels.

Example 68 may include the non-transitory computer-readable medium of example 63, further including: wherein the first signal is frequency shifted by $e^{j2\pi(Tx\_LO-Rx\_LO)n}$ where Tx_LO is a transmit carrier frequency in Hz and Rx_LO is a receive carrier frequency in Hz.

Example 69 may include the non-transitory computer-readable medium of example 63, wherein decimation includes reducing a sampling rate of the one or more first kernels.

Example 70 may include the non-transitory computer-readable medium of example 63, further including: summing one or more outputs of one or more adaptive filters.

Example 71 may include the non-transitory computer-readable medium of example 63, wherein the one or more first kernels are linear representation of the second signal.

Example 72 may include the non-transitory computer-readable medium of example 63, wherein the one or more second kernels are a linear combination of the one or more first kernels.

Example 73 may include the non-transitory computer-readable medium of example 63, further including: regenerating, by the first computing device, the transmit signal in digital domain.

Example 74 may include the non-transitory computer-readable medium of example 63, wherein the transceiver operates in a full duplex system.

Example 75 may include the non-transitory computer-readable medium of example 63, wherein the transceiver operates in a frequency-division duplex system.

Example 76 may include the non-transitory computer-readable medium of example 63, wherein the transceiver operates in a time-division duplex system.

Example 77 may include the non-transitory computer-readable medium of example 63, wherein the transmit signal is a wireless local area network transmission.

Example 78 may include the non-transitory computer-readable medium of example 62, wherein the transmit signal is a Bluetooth signal.

Example 79 may include the non-transitory computer-readable medium of example 63, wherein the transmit signal is a near field communication signal.

Example 80 may include the non-transitory computer-readable medium of example 63, wherein the transmit signal is a radio-telephone communication system signal.

Example 81 may include the non-transitory computer-readable medium of example 63, wherein the transmit signal is an uplink signal according to a communication protocol configured for a second antenna in the first computing device.

Example 82 may include the non-transitory computer-readable medium of example 63, wherein the simulation of the transmit chain comprises computer-executable instructions to: simulate conversion of the transmit signal and simulate power amplification of the transmit signal.

Example 83 may include the non-transitory computer-readable medium of example 82, wherein conversion of the transmit signal models at least one of: a diode front end, an active front end, and a digital-to-analog converter.

An example 84 discloses a non-transitory computer-readable medium storing computer-executable instructions which, when executed by a processor, may cause the processor to perform operations including: sending a transmit signal including one or more non-linear elements; receiving a receive signal comprising at least a portion of the transmit signal through a receive chain of a first computing device; simulating the transmit chain; generating, by the simulated transmit chain, a first signal associated with the transmit signal; generating a second signal by frequency shifting the first signal; generating one or more first kernels associated with the second signal; transforming the one or more first kernels using a lower triangular matrix, into one or more second kernels; performing decimation of the one or more second kernels; combining the one or more second kernels to generate an echo cancellation signal; and subtracting the echo cancellation signal from the received at least a portion of the transmit signal.

Example 85 may include the non-transitory computer-readable medium of example 84, wherein the one or more first kernels are transformed using an inverse of the lower triangular matrix.

Example 86 may include the non-transitory computer-readable medium of example 84, wherein transforming the one or more first kernels includes applying a Cholesky decomposition to the one or more first kernels.

Example 87 may include the non-transitory computer-readable medium of example 84, further comprising: providing a look-up table for one or more second kernels.

Example 88 may include the non-transitory computer-readable medium of example 87, wherein the look-up table for one or more second kernels corresponds to a transformation of the one or more first kernels.

Example 89 may include the non-transitory computer-readable medium of example 84, further including: wherein the first signal is frequency shifted by $e^{j2\pi(Tx\_LO-Rx\_LO)n}$ where Tx_LO is a transmit carrier frequency in Hz and Rx_LO is a receive carrier frequency in Hz.

Example 90 may include the non-transitory computer-readable medium of example 84, wherein decimation includes reducing a sampling rate of the one or more first kernels.

Example 91 may include the non-transitory computer-readable medium of example 84, further including: summing one or more outputs of one or more adaptive filters.

Example 92 may include the non-transitory computer-readable medium of example 84, wherein the one or more first kernels are linear representation of the second signal.

Example 93 may include the non-transitory computer-readable medium of example 84, wherein the one or more second kernels are a linear combination of the one or more first kernels.

Example 94 may include the non-transitory computer-readable medium of example 84, further including: regenerating, by the first computing device, the transmit signal in digital domain.

Example 95 may include the non-transitory computer-readable medium of example 84, wherein the transceiver operates in a full duplex system.

Example 96 may include the non-transitory computer-readable medium of example 84, wherein the transceiver operates in a frequency-division duplex system.

Example 97 may include the non-transitory computer-readable medium of example 84, wherein the transceiver operates in a time-division duplex system.

Example 98 may include the non-transitory computer-readable medium of example 84, wherein the transmit signal is a wireless local area network transmission.

Example 99 may include the non-transitory computer-readable medium of example 84, wherein the transmit signal is a Bluetooth signal.

Example 100 may include the non-transitory computer-readable medium of example 84, wherein the transmit signal is a near field communication signal.

Example 101 may include the non-transitory computer-readable medium of example 84, wherein the transmit signal is a radio-telephone communication system signal.

Example 102 may include the non-transitory computer-readable medium of example 84, wherein the transmit signal is an uplink signal according to a communication protocol configured for a second antenna in the first computing device.

Example 103 may include the non-transitory computer-readable medium of example 84, wherein the simulation of the transmit chain comprises computer-executable instructions to: simulate conversion of the transmit signal and simulate power amplification of the transmit signal.

Example 104 may include the non-transitory computer-readable medium of example 103, wherein conversion of the transmit signal models at least one of: a diode front end, an active front end, and a digital-to-analog converter.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can", "could", "might", or "may", unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

While the invention has been particularly shown and described with reference to specific examples, it should be understood by those skilled in the art that various changes in form and detail may be made therein without departing from the spirit and scope of the invention as defined by the appended claims. The scope of the invention is thus indicated by the appended claims, and all changes within the meaning and range of equivalency of the claims are therefore intended to be embraced.

What is claimed is:

1. A method for echo cancellation comprising:
   sending, by a first computing device through a transmit chain of the first computing device, a transmit signal including one or more non-linear elements;
   receiving, by the first computing device, at least a portion of the transmit signal through a receive chain of the first computing device;
   simulating, by the first computing device, the transmit chain;
   generating, by the first computing device, a first signal associated with the transmit signal;
   generating, by the first computing device, a second signal by frequency shifting the first signal;
   generating, by the first computing device, one or more first kernels associated with the second signal;

transforming, by the first computing device, the one or more first kernels into one or more second kernels;
generating, by the simulated transmit chain, an echo cancellation signal associated with the transmit signal, using the one or more second kernels;
subtracting, by the first computing device, the echo cancellation signal from the at least a portion of the transmit signal received in the receive chain.

2. The method of claim 1, further comprising:
performing, by the first computing device, decimation of the one or more first kernels,
wherein transforming the one or more first kernels comprises using a lower triangular matrix, and
generating the echo cancellation signal comprises combining, by the first computing device, the one or more second kernels.

3. The method of claim 2, wherein transforming the one or more first kernels comprises using an inverse of the lower triangular matrix.

4. The method of claim 2, wherein transforming the one or more first kernels comprises applying a Cholesky decomposition to the one or more first kernels.

5. The method of claim 2, further comprising:
generating a look-up table for one or more second kernels.

6. The method of claim 2, wherein the first signal is frequency shifted by $e^{j2\pi(Tx\_LO-Rx\_LO)n}$ where Tx_LO is a transmit carrier frequency in Hz and Rx_LO is a receive carrier frequency in Hz.

7. The method of claim 2, further comprising:
summing one or more outputs of one or more adaptive filters.

8. The method of claim 1, further comprising:
performing decimation of the one or more second kernels,
wherein transforming the one or more first kernels comprises using a lower triangular matrix, and
generating the echo cancellation signal comprises combining the one or more second kernels.

9. The method of claim 8, further comprising:
generating a look-up table for one or more second kernels.

10. The method of claim 8, wherein transforming the one or more first kernels comprises applying a Cholesky decomposition to the one or more first kernels.

11. The method of claim 1, further comprising:
regenerating, by the first computing device, the transmit signal in digital domain.

12. The method of claim 1, wherein simulating the transmit chain comprises:
simulating conversion of the transmit signal; and
simulating power amplification of the transmit signal.

13. The method of claim 12, wherein simulating conversion of the transmit signal models at least one of:
a diode front end,
an active front end, and
a digital-to-analog converter.

14. The method of claim 1, wherein transforming the one or more first kernels comprises:
transforming the one or more first kernels, by the first computing device, into one or more second kernels such that the one or more second kernels have a lower peak average power ratio than the one or more first kernels.

15. A computing device, comprising:
a transceiver configured to transmit and receive wireless signals;
an antenna coupled to the transceiver;
one or more processors in communication with the transceiver;
a receive chain of the computing device configured to receive a receive signal that comprises at least a portion of a transmit signal;
at least one non-transitory memory that stores computer-executable instructions; and
at least one processor of the one or more processors configured to access the at least one memory,
wherein the at least one processor of the one or more processors is configured to execute the computer-executable instructions to:
send the transmit signal including one or more non-linear elements;
simulate the transmission chain;
generate a first signal associated with the transmit signal;
generate a second signal by frequency shifting the first signal;
generate one or more first kernels associated with the second signal;
transform the one or more first kernels into one or more second kernels;
generate, by the simulated transmission chain, an echo cancellation signal associated with the transmit signal, using the one or more second kernels; and
subtract the echo cancellation signal from the at least a portion of the transmit signal received in the receive chain.

16. The computing device of claim 15, wherein the at least one processor of the at least one or more processors is further configured to execute the computer-executable instructions to:
perform decimation of the one or more first kernels;
transform the one or more first kernels into one or more second kernels using a lower triangular matrix; and
combine the one or more second kernels to generate the echo cancellation signal.

17. The computing device of claim 15, wherein the at least one processor of the at least one or more processors is further configured to execute the computer-executable instructions to:
transform the one or more first kernels into one or more second kernels using a lower triangular matrix; and
perform decimation of the one or more second kernels;
combine the one or more second kernels to generate the echo cancellation signal.

18. The computing device of claim 15, wherein the at least one processor of the at least one or more processors is further configured to execute the computer-executable instructions to:
transform the one or more first kernels into one or more second kernels such that the one or more second kernels are orthogonal to the one or more first kernels.

19. A non-transitory computer-readable medium storing computer-executable instructions which, when executed by a processor, cause the processor to perform operations comprising:
sending a transmit signal including one or more non-linear elements;
receiving a receive signal comprising at least a portion of the transmit signal through a receive chain of a first computing device;
simulating the transmit chain;
generating, by the simulated transmit chain, a first signal associated with the transmit signal;
generating a second signal by frequency shifting the first signal;

generating one or more first kernels associated with the second signal;
performing decimation of the one or more first kernels;
transforming the one or more first kernels using a lower triangular matrix, into one or more second kernels;
combining the one or more second kernels to generate an echo cancellation signal; and
subtracting the echo cancellation signal from the at least a portion of the transmit signal received in the receive chain.

20. The non-transitory computer-readable medium of claim 19, wherein the one or more first kernels are transformed using an inverse of the lower triangular matrix.

* * * * *